United States Patent [19]

Glancy

[11] Patent Number: 4,698,964
[45] Date of Patent: Oct. 13, 1987

[54] AUTOMATIC DEFLECTOR FOR A JET ENGINE BLEED AIR EXHAUST SYSTEM

[75] Inventor: Jerry L. Glancy, Wichita, Kans.

[73] Assignee: The Boeing Company, Seattle, Wash.

[21] Appl. No.: 773,206

[22] Filed: Sep. 6, 1985

[51] Int. Cl.⁴ .............................................. F02K 3/02
[52] U.S. Cl. .............................. 60/226.2; 244/110 B; 415/145
[58] Field of Search ...................... 60/226.2, 230, 232, 60/226.1, 262; 244/110 B; 239/265.19, 265.25, 265.29, 265.31, 265.37; 415/145

[56] References Cited

U.S. PATENT DOCUMENTS

| | | | |
|---|---|---|---|
| 3,330,115 | 7/1967 | Markowski | 60/226.2 |
| 3,638,428 | 2/1972 | Shipley et al. | 415/145 |
| 3,898,799 | 8/1975 | Pollert et al. | 415/145 |
| 4,155,681 | 5/1979 | Linko et al. | 415/144 |
| 4,463,552 | 8/1984 | Monhardt et al. | 60/226.1 |
| 4,564,160 | 1/1986 | Vermilye | 60/226.2 |

Primary Examiner—Louis J. Casaregola
Assistant Examiner—Donald E. Stout

[57] ABSTRACT

An automatic deflector for deflecting hot exhaust air from a bleed air exhaust port of a jet engine compressor. The deflector deflecting the hot air into the engine's fan duct when the engine is in a thrust reversal mode. The deflector prevents hot air from contacting and damaging the fan duct wall opposite the air exhaust port.

8 Claims, 2 Drawing Figures

AUTOMATIC DEFLECTOR FOR A JET ENGINE BLEED AIR EXHAUST SYSTEM

BACKGROUND OF THE INVENTION

This invention relates to a deflector for deflecting hot air exhaust and more particularly, but not by way of limitation, to a deflector used in conjunction with a hot air exhaust port of the jet engine compressor. Heretofore, many jet engines have been designed where the compressed air from the jet engine's compressor is dumped overboard to prevent compressor stalling. For this reason, the compressor includes surge bleed ports, valves and ducts. The exhaust air is ducted to an exterior surface of the engine cowling or into the engine fan duct. On some engines part of the surge bleed air is only exhausted during thrust reversal on landing. At this time, the extremely hot exhaust air impinges against the opposite wall of the fan duct causing damage to the wall if the wall is unprotected. Fan duct walls are normally acoustic walls made up of aluminum perforated face sheet, aluminum honeycomb core and a solid aluminum back sheet. This type of wall construction must be protected from the heat of the exhaust air.

Some of the prior solutions to the above-mentioned problems have been explored such as making the section of the fan duct where the hot air impinges out of stainless steel or titanium. This solution adds weight and cost to the thrust reversal system. Also, it reduces the acoustic area. Another solution is to extend the surge bleed duct and exhaust port further aft in the engine so the air does not impinge on the duct wall. This will add weight and complicate the engine ducting and accessories. Also, a fixed deflector if added in the fan duct will degrade the engine performance. Further, the exhausting of the air forward of the fan duct blocker doors could be provided so the hot air mixes with the fan air and exits out through the engine's cascades. This solution causes the hot air to impinge against the blocker door which would have to be protected against the hot air. Further, removing a portion of one of the blocker doors forward of the surge bleed exhaust so the cool air would mix with the hot air has been explored. This solution causes a loss in thrust reversal performance and may not cool the exhaust air down to an acceptable level.

In the following United States Patents, various types of air deflector by-pass mechanisms and bleed air valves are disclosed: U.S. Pat. Nos. 3,588,268 to Hampton; 3,638,428 to Shipley; 3,688,504 to Hutchinson et al; 3,898,799 to Pollert et al; 4,086,761 to Schaut et al; 4,155,681 to Linko, III et al; 4,344,282 to Anders and 4,463,552 to Monhardt et al. None of these prior art patents particularly point out and describe the unique features and advantages of the subject invention.

SUMMARY OF THE INVENTION

The subject automatic deflector for a jet engine bleed air exhaust port opens automatically when the jet engine is in a thrust reversal mode. The deflector eliminates potential damage of the hot exhaust air contacting the oppositely disposed duct wall when the hot air is exhausted out the compressor exhaust port.

The deflector, when in an open position for deflecting the hot exhaust air, is parallel to the airstream through the fan duct thereby causing the bleed air to be deflected aft and out through the fan duct nozzle.

The deflector is automatically opened and closed when hinged to the blocker door drag link. In the alternative the deflector may be automatically opened and closed through the use of a drive link with a torsion spring. The deflector opens when the hot air is exhausted and overcomes the torsion spring pressure.

The automatic deflector for a jet engine bleed air exhaust port includes a deflector plate disposed above and closing the exit of a surge bleed exhaust port. The deflector also includes one or more link arms which are pivotally attached to the inner fan duct wall. The links may be pivotally connected to a push/pull rod connected to one end of the blocker door drag link or one of the links may include torsion spring which normally will hold the deflector in a closed position. The bias of the spring is overcome when the hot exhaust air is introduced through the exhaust port.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
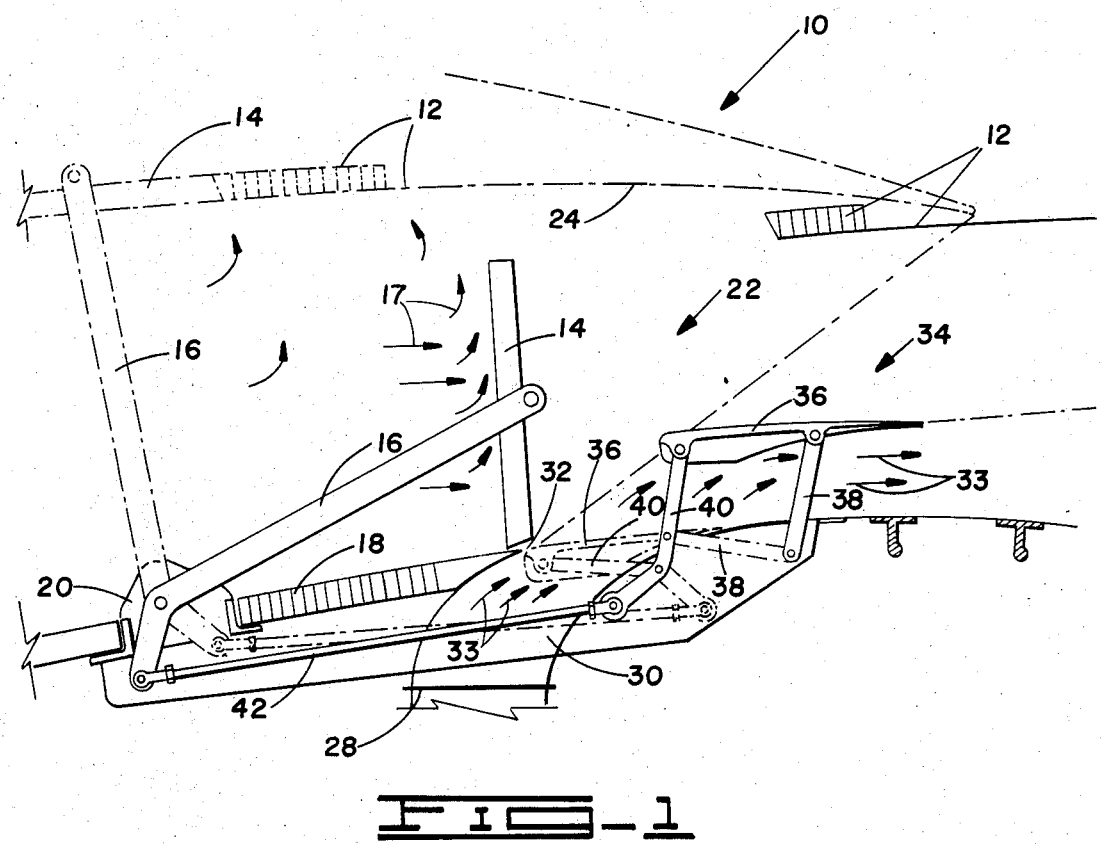
FIG. 1 illustrates the automatic deflector in a raised and lowered position in a jet engine fan duct.
Figure 2:
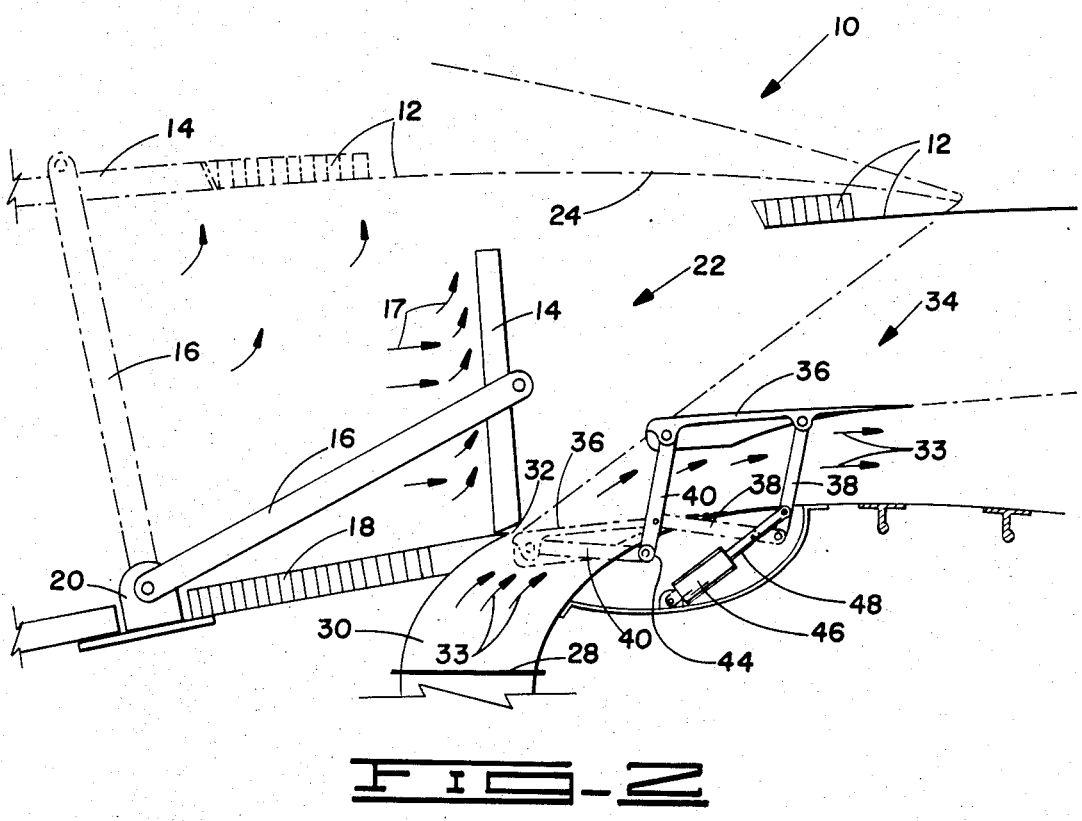
FIG. 2 illustrates an alternate embodiment of the automatic deflector in a raised and lowered position in the engines fan duct.

In FIG. 1 and FIG. 2 a portion of a jet engine is shown and designed by general reference numeral 10. The engine 10 includes a thrust reverser sleeve 12 shown in dotted lines in a forward closed position and in solid lines when the thrust reverser sleeve is moved into an opened position during a thrust reversal mode. At this time a blocker door 14 attached to a blocker door drag link 16 moves from a closed position to the right into an opened position shown in solid lines for deflecting and changing the direction of the fan duct air through a plurality of cascades in the thrust reverser fixed structure. The duct air is indicated by arrows 17.

The cascades are not shown in these drawings. The blocker door drag link 16 is pivotally attached to a fan duct inner wall 18 by a pivot mounting plate 20. The fan duct is designated by general reference numeral 22 and is disposed between the inner wall 18 and a fan duct outer wall 24.

During a thrust reversal cycle the jet engine compressor will discharge hot exhaust air to prevent the engine's compressor from stalling. This hot exhaust air is discharged through a surge bleed valve 28, through a surge bleed exhaust port 30 and out an opening 32 in the fan duct inner wall 18. Prior to this introduction of the subject invention, this hot exhaust air would flow outwardly contacting the opposite fan duct outer wall 24 causing damage thereto because of the heat of the exhaust air.

In FIG. 1 the automatic deflector for a jet engine's exhaust system is shown and designated by general reference numeral 34. The deflector 34 includes a deflector plate 36 made up of a metal or alloy which can withstand damage from the hot exhaust air. The plate 36 shown in dotted lines and in its normal closed position over the opening 32 of port 30 provides a smooth aerodynamic surface for the fan air to pass over. When the engine 10 moves into a thrust reversal mode, the deflector plate 36 is moved upwardly and parallel to the air stream in the fan duct 22. The plate 36 is moved through the use of an idler link arm 38 and a drive link arm 40 pivotally attached at one end to the bottom of the deflector plate 36. The other end of the arms 38 and 40 are pivotally attached to a portion of the inner wall 18. The drive link is pivotally attached to one end of a push-pull rod 42. The other end of the rod 42 is pivotally connected to the lower end of the blocker door drag link 16. The plate 36 and arms 38 and 40 are shown in a closed position in dotted lines with the plate 36 on top of the port 30. The plate 36 and arms 38 and 40 are shown in solid lines in a raised or open position.

When the jet engine 10 goes into a thrust reversal mode the blocker door 14 is moved from a closed stowed position into a position perpendicular to the air stream in the fan duct 22. At this time, the lower end of the drag link 16 pivots from right to left moving the rod 42 to the left and in turn rotating the link arms 38 and 40 upwardly, raising the deflector plate 36 from its closed position over the top of the port 30 upwardly and parallel to the air stream in the fan duct 22. At this time the hot exhaust air indicated by arrows 33 escapes through the opening 32 in the top of the port 30 where it moves upwardly engaging the bottom side of the deflector plate 36 and escaping outwardly and to the right in the fan duct 22.

In FIG. 2 an alternate embodiment of the deflector 34 is illustrated and rather than using the push/pull rod 42 as shown in FIG. 1 a torsion spring 44 is used and connected to the pivot connection at the lower end of the drive link arm 40 and the inner wall 18. The torsion spring 44 biases the drive link arm 40 and in turn the idler link arm 38 in a counter clockwise direction rotating the deflector plate 36 downwardly and in a closed position on top of the exhaust port 30. When the engine goes into a thrust reversal mode and the bleed valve 28 is opened, the hot exhaust air provides sufficient pressure to overcome the bias force of the torsion spring 44 thereby raising the deflector plate 36 upwardly, rotating the arms 38 and 40 in a clockwise direction with the deflector plate 36 in a raised parallel position in the air stream of the fan duct 22. When the valve 28 is again closed and the pressure of the hot exhaust air no longer engages the bottom surface of the deflector plate 36, the bias force of the torsion spring 44 rotates the arms 38 and 40 in a counter clockwise position returning the plate 36 to its original closed position. A damper spring cylinder 46 with arm 48 is attached to the idler link arm 38 to damper the force on the link arms 38 and 40 as the deflector plate 36 is raised into the air stream and again returned on top of the exhaust port 30.

Changes may be made in the construction and arrangement of the parts or elements of the embodiments as described herein without departing from the spirit or scope of the invention defined in the following claims.

What is claimed is:

1. In a jet engine having a fan duct defined by an inner wall for guiding an air stream, a selectable thrust reversal mode, and a bleed air exhaust port in said inner wall for directing exhaust air into said fan duct when said thrust reversal mode is selected, an automatic deflector comprising:
   a deflector plate movably disposed in said fan duct; and
   means responsive to selection of said thrust reversal mode for moving said deflector plate between a closed position generally flush with said inner wall and an open position disposed in and generally parallel with said air stream and disposed in the path of exhaust air from said bleed air exhaust port to deflect said exhaust air into said air stream.

2. The automatic deflector of claim 1 wherein said moving means comprises:
   link means pivotally connecting said deflector plate to said inner wall for moving said deflector plate between said closed position and said open position, said link means disposing said deflector plate in generally parallel, spaced relation with said inner wall in said open position.

3. The automatic deflector of claim 2 wherein said link means comprises a drive link arm and an idler link arm, said arms pivotally connecting said deflector plate to said inner wall for generally parallel movement of said deflector plate between said closed and open positions.

4. The automatic deflector of claim 2 wherein said engine includes a blocker door structure selectively disposed in said fan duct air stream during thrust reversal mode and wherein said moving means comprises rod means mechanically interconnecting said link means with said blocker door structure for moving said deflector plate between said open and closed positions in response to movement of said blocker door into and out of, respectively, said fan duct air stream.

5. The automatic deflector of claim 4, wherein said link means comprises a drive link arm and an idler link arm, said arms pivotally connecting said deflector plate to said inner wall for generally parallel movement of said deflector plate between said closed and open positions, and wherein said rod means comprises a push/pull rod pivotally connected to said drive link arm.

6. The automatic deflector of claim 2, wherein said moving means comprises means connected to said link means for biasing said deflector plate to said closed position when said bleed air exhaust port is closed, said biasing means permitting said exhaust air to move said deflector plate to said open position when said bleed air exhaust port is open.

7. The automatic deflector of claim 6 wherein said link means comprises a drive link arm and an idler link arm, said arms pivotally connecting said deflector plate to said inner wall for generally parallel movement of said deflector plate between said closed and open positions and wherein said biasing means comprises a torsion spring operatively disposed between said drive link arm and said inner wall to bias said drive link arm and said deflector plate to the closed position, the force of said spring being less than the force of said exhaust air acting on said deflector plate when said bleed air exhaust port is open.

8. The automatic deflector of claim 7 also including means for dampening the action of said biasing means when moving said deflector plate to said closed position.

* * * * *

UNITED STATES PATENT AND TRADEMARK OFFICE
CERTIFICATE OF CORRECTION

PATENT NO. : 4,698,964

DATED : October 13, 1987

INVENTOR(S) : Jerry L. Glancy

It is certified that error appears in the above-identified patent and that said Letters Patent is hereby corrected as shown below:

Column 2, line 34, change "designed" to --designated--.

Signed and Sealed this

Twelfth Day of April, 1988

Attest:

DONALD J. QUIGG

*Attesting Officer*  *Commissioner of Patents and Trademarks*